US008458954B2

(12) United States Patent
Yamada et al.

(10) Patent No.: US 8,458,954 B2
(45) Date of Patent: Jun. 11, 2013

(54) LIGHTING APPARATUS FOR CONTROLLING PLANT DISEASE

(75) Inventors: Makoto Yamada, Kadoma (JP); Masaki Ishiwata, Kadoma (JP); Akinobu Oichi, Kadoma (JP); Kanetake Furihata, Kadoma (JP); Takashi Omi, Kadoma (JP)

(73) Assignee: Panasonic Corporation, Osaka (JP)

( * ) Notice: Subject to any disclaimer, the term of this patent is extended or adjusted under 35 U.S.C. 154(b) by 179 days.

(21) Appl. No.: 12/935,042

(22) PCT Filed: Apr. 8, 2009

(86) PCT No.: PCT/JP2009/057206
§ 371 (c)(1),
(2), (4) Date: Sep. 28, 2010

(87) PCT Pub. No.: WO2009/131008
PCT Pub. Date: Oct. 29, 2009

(65) Prior Publication Data
US 2011/0016785 A1    Jan. 27, 2011

(30) Foreign Application Priority Data

Apr. 24, 2008  (JP) .................................. 2008-114254

(51) Int. Cl.
*A01G 7/00*  (2006.01)
(52) U.S. Cl.
USPC ............... 47/58.1 LS; 47/DIG. 6; 250/504 R; 422/24; 362/805

(58) Field of Classification Search
USPC ......... 47/1.01 R, 17, 60, 61, DIG. 6, 58.1 LS, 47/58.1 SE, 58.1 R; 362/563, 805; 250/493.1, 250/503.1, 504 R, 494.1, 492.1; 422/22, 422/24
See application file for complete search history.

(56) References Cited

U.S. PATENT DOCUMENTS

| | | | | |
|---|---|---|---|---|
| 4,749,916 A | * | 6/1988 | Yamazaki et al. | 315/254 |
| 5,012,609 A | * | 5/1991 | Ignatius et al. | 47/1.01 R |

(Continued)

FOREIGN PATENT DOCUMENTS

| | | |
|---|---|---|
| JP | 2001-28947 | 2/2001 |
| JP | 2003-339236 | 12/2003 |

(Continued)

*Primary Examiner* — T. Nguyen
(74) *Attorney, Agent, or Firm* — Greenblum & Bernstein, P.L.C.

(57) ABSTRACT

A lighting apparatus for controlling a plant disease is provided to reliably inhibit a spore formation and a hyphal growth of a filamentous fungi, reliably induce a disease resistance, prevent a leaf scorch, and promote a growth of a plant. A UV light source repeats a light irradiation which has an irradiation pattern of combining a light irradiation, in which UV-C and UV-B and a visible light are superimposed, with a visible light irradiation alone at least twice a day. The emission of UV-B and UV-C enables the reliable inhibition of the spore formation of the filamentous fungi, for example. Its intermittent emission prevents a plant from getting too used to ultraviolet rays, promotes a generation of an antibacterial substance, for example, and prevents a leaf scorch. The continuous emission of the visible light enables a promotion of a growth of the plant.

12 Claims, 4 Drawing Sheets

U.S. PATENT DOCUMENTS

| | | | |
|---|---|---|---|
| 5,040,329 A * | 8/1991 | Michaloski | 47/65 |
| 7,875,862 B1 * | 1/2011 | Hudson et al. | 250/492.1 |
| 7,905,052 B2 * | 3/2011 | Hurst et al. | 47/29.4 |
| 2007/0151149 A1 * | 7/2007 | Karpinski | 47/58.1 LS |
| 2007/0205382 A1 * | 9/2007 | Gaska et al. | 250/504 R |
| 2009/0272029 A1 * | 11/2009 | Aiking et al. | 47/1.43 |
| 2010/0193707 A1 | 8/2010 | Yamada et al. | |
| 2010/0281771 A1 * | 11/2010 | Kudo et al. | 47/58.1 LS |
| 2011/0209404 A1 * | 9/2011 | Scott | 47/58.1 LS |
| 2012/0124903 A1 * | 5/2012 | Takeuchi | 47/58.1 LS |

FOREIGN PATENT DOCUMENTS

| | | |
|---|---|---|
| JP | 2005-328702 | 12/2005 |
| JP | 2005-328734 | 12/2005 |
| JP | 2006-158262 | 6/2006 |
| WO | 2009/011349 | 1/2009 |

* cited by examiner

LIGHTING APPARATUS FOR CONTROLLING PLANT DISEASE

TECHNICAL FIELD

The present invention relates to a lighting apparatus for controlling a plant disease which emits ultraviolet rays to a plant to control a plant disease.

BACKGROUND TECHNIQUE

Conventionally, there is a well known lighting apparatus for controlling a plant disease. The above lighting apparatus emits ultraviolet rays which are controlled to include a wavelength component in a UV-B range (the wavelength range 280 to 340 nm) and set a wavelength component in a UV-C range (the wavelength range 100 to 280 nm) to almost zero (refer to Japanese Laid-Open Patent Publication No. 2005-328734, for example). According to the above lighting apparatus, a spore formation and a hyphal growth of filamentous fungi which cause gray mold, powdery mildew, downy mildew, anthracnose, or the like can be inhibited.

There is also a well known lighting apparatus for controlling a plant disease which emits ultraviolet rays, which has a wavelength range 250 to 375 nm, red light, blue light, and yellow light to reduce a disease and insect damage on a plant (refer to Japanese Laid-Open Patent Publication No. 2001-28947, for example).

However, the lighting apparatus described in the Publication No. 2005-328734 cannot emit UV-C to the plant and thereby cannot reliably inhibit the spore formation and the hyphal growth of the filamentous fungi described above. Moreover, almost no visible light is emitted, so that it is difficult to promote a plant growth. There is also a possibility that the plant gets too used to ultraviolet rays due to a continuous irradiation of ultraviolet rays and thereby a generation of an antibacterial substance or resistive substance is reduced, so that the induction of resistance against the plant diseases is often difficult. Moreover, there is also a possibility of a leaf scorch caused by the continuous irradiation of ultraviolet rays.

The lighting apparatus described in the Publication No. 2001-28947 emits ultraviolet rays in the UV-C range as well as ultraviolet rays in the UV-B range and thereby can reliably inhibit the spore formation and the hyphal growth of the filamentous fungi described above. Moreover, the visible light is emitted, so that the plant growth can be promoted, however, as described above, there is a possibility that the induction of resistance against the plant diseases is reduced or the leaf scorch occurs due to the continuous irradiation of ultraviolet rays.

DISCLOSURE OF THE INVENTION

In order to solve the problem of the conventional art described above, an object of the present invention is to provide a lighting apparatus for controlling a plant disease in which a spore formation and a hyphal growth of filamentous fungi which cause gray mold, powdery mildew, downy mildew, anthracnose, or the like, can reliably be controlled to inhibit the plant disease, a disease resistance of the plant can reliably be induced, a leaf scorch can be prevented, and moreover, a plant growth can be promoted.

A lighting apparatus for controlling a plant disease according to one aspect of the present invention, which emits a light including ultraviolet rays to a plant, has a UV light source which emits UV-B and UV-C in which a wavelength component of approximately 250 nm or less is cut off in UV-C, a visible light source which emits visible light, and a controller which controls an operation of the UV light source and the visible light source, wherein the controller controls the respective light sources and repeats a light irradiation which has an irradiation pattern of combining a first light irradiation, in which ultraviolet rays of UV-C and UV-B and the visible light are superimposed, with a second light irradiation which is made up of the visible light alone at least twice a day. In other words, the light controller repeats a light irradiation which has an irradiation pattern of combining a first light irradiation and a second light irradiation at least twice a day. The first light irradiation includes the UV-C and UV-B and the visible light that are superimposed, and the second light irradiation includes the visible light alone.

According to the above configuration, a plant can be irradiated with UV-C in addition to UV-B, so that the spore formation and the hyphal growth of the filamentous fungi which cause gray mold, powdery mildew, downy mildew, anthracnose, or the like can reliably be inhibited. Moreover, the plant is irradiated with UV-C and UV-B intermittently, so that the plant is prevented from getting too used to ultraviolet rays, and as a result, a generation of an antibacterial substance or resistive substance including phytoalexin-related material and PR (Pathogenesis Related) protein material, for example, can be promoted, and the disease resistance of the plant can reliably be induced. Moreover, the leaf scorch can be prevented. Furthermore, the visible light is continuously emitted, so that the plant growth can be promoted.

In the above lighting apparatus, it is also applicable as the irradiation pattern that the first light irradiation and the second light irradiation are sequentially repeated one after another by turning on the visible light source continuously and turning on the UV light source intermittently.

In the above lighting apparatus, the controller can also control the respective light sources to emit the UV-C and the UV-B of approximately 50 µW/cm$^2$ or less as a total irradiance and emit the UV-C and the UV-B of approximately 0.2 to 10 kJ/m$^2$ as an integrated irradiance per day.

According to the above configuration, the plant is not exposed to too much ultraviolet rays but can be irradiated with a proper amount of UV-C and UV-B, thus, the scorch of the plant can reliably be inhibited and the occurrence of plant disease can be inhibited.

In the above lighting apparatus, the UV light source and the visible light source can also be set up on an upper side, a lateral side, and a bottom side of a plant which is an object to be irradiated.

When the plural plants are planted and grown close relatively, the light source which irradiates the plants only from the upper side of the plants cannot sufficiently irradiate a lateral and bottom sides of the plants which are adjacent to each other by reason that the plants fall under shadow of the plants themselves, and thereby there is a possibility that the lateral and bottom sides of the plants are affected by a disease, however, according to the above configuration, the plants can be irradiated from the lateral and bottom sides, so that the possibility of the plant disease in the lateral and bottom sides can be lowered.

In the above lighting apparatus, the UV light source also include a light source which emits UV-C and UV-B and a filter which blocks out a wavelength component of approximately 250 nm or less in the UV-C and UV-B emitted by the light source.

In the above light apparatus, the light source can also be made up of a fluorescent lamp which emits UV-C and UV-B, a HID (High Intensity Discharged) lamp, or a UV-LED alone or a combination of them.

In the above light apparatus, the filter can also have a UV-A-proof configuration.

According to the above configuration, ultraviolet rays which are emitted to the plant have almost no wavelength component in the range of UV-A, which promotes the spore formation of the filamentous fungi, so that the spore formation and the hyphal growth of the filamentous fungi can be inhibited more effectively and the spread of the plant disease can be reduced, and ultimately, crop yields can be increased. The light including UV-A has an effect to attract insects, so that the insect attraction is inhibited by blocking out UV-A, and a damage from a pest can thereby be reduced.

DESCRIPTION OF THE PREFERRED EMBODIMENTS

A lighting apparatus for controlling a plant disease (abbreviated as the lighting apparatus hereinafter) according to a preferred embodiment of the present invention is described with reference to FIGS. 1 to 4. The lighting apparatus, which is used in a fully-closed plant seedling production system, a protected cultivation using an agricultural plastic greenhouse, glass house, or the like, or an open culture, for example, irradiates a plant with ultraviolet rays and so on for controlling a plant disease.

Figure 1:
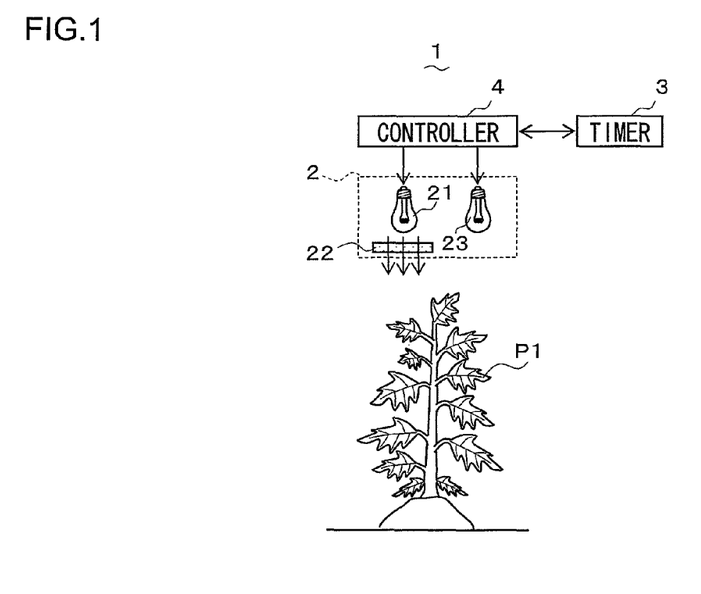
FIG. 1 is a front view showing one configuration example of a lighting apparatus for controlling a plant disease according to a first preferred embodiment of the present invention.
Figure 2:
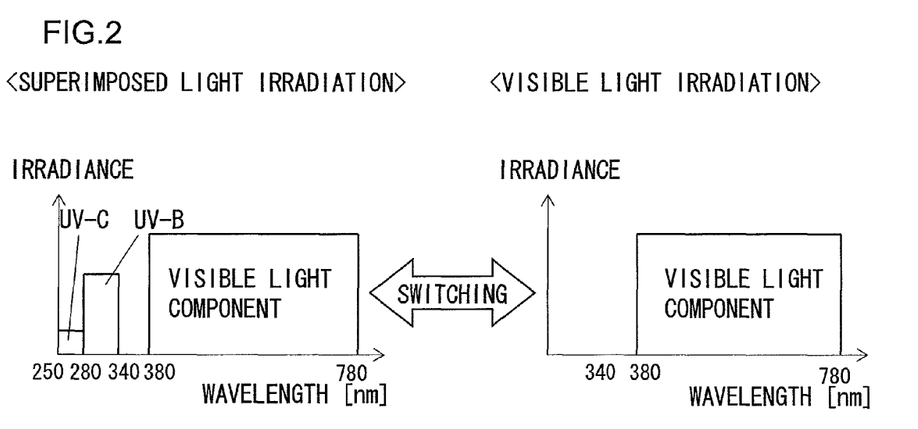
FIG. 2 is a chart showing a spectral distribution during an emission of a superimposed light and a visible light from a light source of the lighting apparatus in FIG. 1.

FIG. 1 shows a configuration of a lighting apparatus according to the present preferred embodiment. A lighting apparatus 1 has a light source 2 which emits a light to a plant P1, a timer 3, and a controller 4 (control unit) which uses the timer 3 for time keeping and performs a light control of the light source 2. The light source 2 can switch between a superimposed light, in which ultraviolet rays and a light which reaches its peek in a wavelength range of visible light (abbreviated as the visible light hereinafter) are superimposed, (abbreviated as the superimposed light hereinafter) and the visible light alone and emit either one. As shown in FIG. 2, the light source 2 emits UV-C in which a wavelength component of approximately 250 nm or less is cut off (the wavelength range: approximately 100 to 280 nm) and UV-B (the wavelength range: approximately 280 to 340 nm) as ultraviolet rays and additionally emits the visible light having the wavelength range of approximately 380 to 780 nm when emitting the superimposed light (a first light irradiation). Although it is preferable not to emit UV-A (wavelength range: approximately 340 to 380 nm) if possible, the emission of UV-A causes no problem as long as its irradiance is lower than a total irradiance of UV-C and UV-B. Only the visible light is emitted when emitting the visible light (a second light irradiation). The controller 4 uses the timer 3 for time keeping and performs a light control of the light source 2 so as to repeat the light irradiation which has the irradiation pattern of combining the superimposed light irradiation and the visible light irradiation at least twice a day.

The light source 2 includes a UV light source 21, a filter 22 which controls a wavelength of a light emitted from the UV light source 21, and a visible light source 23. The plant P1 is irradiated with the light from an upper side, so that the light source 2 is basically located above the plant P1, however, the location of the light source 2 is not limited to the above.

Figure 3:
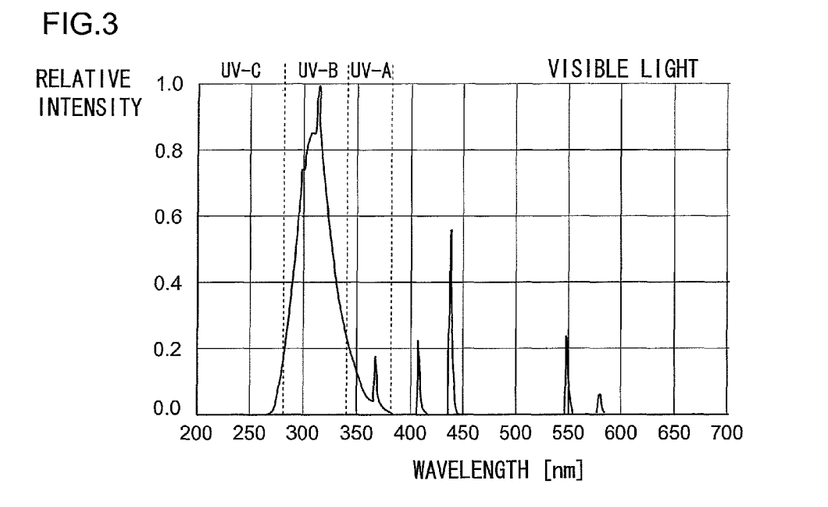
FIG. 3 is a chart showing a spectral distribution example of a UV light source which makes up the light source in FIG. 2.

It is preferable that the UV light source 21 has the spectral distribution shown in FIG. 3 and is made up of a fluorescent lamp which emits UV-B and UV-C in which the wavelength component of approximately 250 nm or less is cut off in UV-C, a HID lamp, or a UV-LED alone or a combination of them (light source), however, it can also have a configuration to emit UV-C which includes the wavelength component of approximately 250 nm or less or UV-A as long as its irradiance is lower than the total irradiance of UV-C and UV-B. As the fluorescent lamp, a UV-B ultraviolet lamp manufactured by Sankyo Denki Co., Ltd. (product number GL20E) can be used, for example. The HID lamp includes a metal halide lamp, a mercury lamp, a xenon lamp, for example. As the metal halide lamp, Skybeam lamp manufactured by Matsushita Electric Industrial Co., Ltd. can be used.

The light control is performed on the UV light source 21 to emit UV-B and UV-C, in which the wavelength component of approximately 250 nm or less is cut off in UV-C, of approximately 50 $\mu$W/cm$^2$ or less as a total irradiance. The total irradiance can be set by a user or can also be preset. The light control of the UV light source 21 is performed by the controller 4 using the timer 3 to emit UV-C and UV-B of approximately 0.2 to 10 kJ/m$^2$ as an integrated irradiance per day. Moreover, when the UV light source 21 is made up of a combination of several types of the light sources, the light control of the UV light source 21 is performed to emit smaller amount of UV-C than UV-B, in particular, a ratio between the UV-C irradiation and the UV-B irradiation is set to approximately 0.04 to 0.1:1, for example.

The filter 22 is made of a glass or a resin, for example, blocks out the wavelength component of approximately 250 nm or less in the light emitted from the UV light source 12 to the plant P1, and transmits almost no UV-A, that is to say, ultraviolet rays having the wavelength of approximately 340 to 380 nm. It is preferable that the filter 22 transmits the light in the visible light range having a wavelength of approximately 460 to 550 nm.

The visible light source 23 can be made up of a white LED, a white fluorescent lamp, an incandescent lamp, or a high-pressure sodium lamp, for example. It is preferable that the light control of the visible light source 23 is performed to make the irradiance be approximately 400 $\mu$W/cm$^2$ or more.

Figure 4:
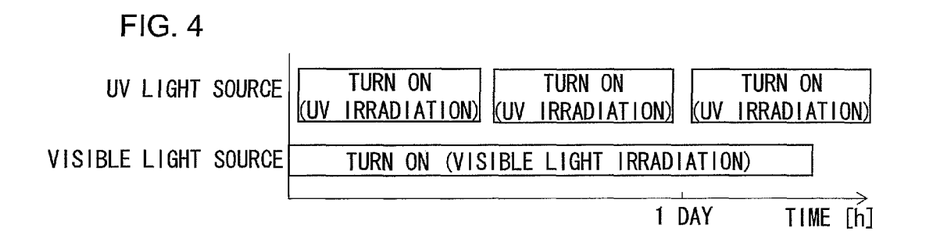
FIG. 4 is a chart showing a lighting pattern of the UV light source and a visible light source which make up the light source in FIG. 2.

The controller 4 can be made up of a microprocessor, for example, and as shown in FIG. 4, the microprocessor, for example, performs the light control of the UV light source 21 and the visible light source 23 to repeat the light irradiation, which has the lighting pattern of turning on the UV light source 21 intermittently and the visible light source 23 continuously at least twice a day. Such a light control enables the obtainment of a pattern, in which the superimposed light irradiation and the visible light irradiation are sequentially repeated one after another as one example of the irradiation pattern of combining the superimposed light irradiation and the visible light irradiation.

The controller 4 times an integrated lighting time of the UV light source 21 using the timer 3, controls the lighting time of the UV light source 21 per day in accordance with the integrated irradiance of UV-C and UV-B, and sets the integrated irradiance to a predetermined numerical value within 0.2 to 10 kJ/m$^2$.

A table 1 described below shows a ratio of damaged plants and a ratio of leaf scorch of plants in case of a continuous irradiation of UV-B as is conventionally done, in case of a continuous irradiation of the combined UV-B and UV-C, in which a wavelength component of approximately 250 nm or less is cut off in UV-C, and in case of the intermittent irradiation of the combined UV-C and UV-B and the continuous irradiation of the visible light according to the present preferred embodiment. In the experiment, there are plural test sections, the number of plants is approximately 100 in each test section, and strawberry is used as a crop under test. The ratio of damaged plants is obtained by dividing the number of damaged plants by the number of plants in each test section, and the ratio of leaf scorch is obtained by dividing the number of leaf scorch of plants by the number of plants in each test section.

TABLE 1

|  | Continuous irradiation of UV-B alone | Continuous combined UV-C + UV-B | Intermittent irradiation of combined UV-C + UV-B and continuous irradiation of visible light (present preferred embodiment) |
| --- | --- | --- | --- |
| Ratio of damaged plants [%] | 5 to 10 | 0 to 3 | 3.6 |
| Ratio of leaf scorch [%] | 5 to 50 | 10 to 60 | 0 |

As shown in the table 1, when irradiating continuously the crop under test with UV-B alone, the ratio of damaged plants is 5 to 10% and the ratio of leaf scorch is 5 to 50%. When irradiating continuously the crop under test with the combined UV-C and UV-B, the ratio of damaged plants is 0 to 3%, which is lower than the ratio when irradiating with UV-B alone. In this case, the ratio of leaf scorch is 10 to 60%. In contrast, when irradiating intermittently the crop under test with the combined UV-C and UV-B and irradiating continuously the crop under test with the visible light as described in the present preferred embodiment, the ratio of damaged plants is approximately 3.6%. The ratio of the leaf scorch is 0% that is the lowest ratio.

A table 2 described below shows a ratio of damaged fruits and an amount of phytoalexin-related material in plants in case of a continuous irradiation of the visible light alone, in case of a continuous irradiation of the combined ultraviolet rays and the visible light, and in case of the intermittent irradiation of ultraviolet rays and the continuous irradiation of the visible light according to the present preferred embodiment. Also in the present experiment, strawberry is used as a crop under test. The irradiation of ultraviolet rays is repeated twice a day. The phytoalexin-related material is phenylalanine ammonia-lyase and a resistive substance, in particular. In the present experiment, the phytoalexin-related material is obtained from the strawberry leaves and its amount is analyzed with High Performance Liquid Chromatography (HPLC). A UV-B ultraviolet lamp manufactured by Sankyo Denki Co., Ltd. (product number GL20E) is used as the UV light source, and the ultraviolet irradiance is set to 30 μW/cm$^2$ on average and the ultraviolet integrated irradiance is set to approximately 5.4 kJ/m$^2$.

TABLE 2

|  | Continuous irradiation of visible light alone | Continuous irradiation of combined ultraviolet rays and visible light | Intermittent irradiation of ultraviolet rays and continuous irradiation of visible light (present preferred embodiment) |
| --- | --- | --- | --- |
| Ratio of damaged fruits [%] | 39 | 4.3 | 1.2 |
| Amount of phytoalexin-related material [μg/g] | 0.9 | 11.9 | 16.8 |

As shown in the table 2, in case of the continuous irradiation of the visible light, in case of the continuous irradiation of the ultraviolet rays and the visible light, and in case of the intermittent irradiation of ultraviolet rays and the continuous irradiation of the visible light, the ratios of damaged fruits are 39, 4.3, and 1.2%, respectively. The amounts of the phytoalexin-related material are 0.9, 11.9, and 16.8 μg/g, respectively. That is to say, the ratio of damaged fruits is lowest and the amount of phytoalexin-related material is highest when emitting intermittently ultraviolet rays and emitting continuously the visible light.

A table 3 described below shows a ratio of damaged plants caused by a disease, a ratio of leaf scorch of plants, and a ratio of damaged plants caused by noctuid when changing the integrated irradiance of UV-C and UV-B (abbreviated as the ultraviolet irradiance, hereinafter). Also in the present experiment, strawberry is used as a crop under test. The ratio between the UV-C irradiation and the UV-B irradiation is set to approximately 0.1:1, and the visible light whose irradiance is 0.2 μW/cm$^2$ is also emitted in addition to UV-C and UV-B.

TABLE 3

| Ultraviolet irradiance [μW/cm$^2$] | Ratio of damaged plants cause by disease [%] | Ratio of leaf scorch [%] | Ratio of damaged plants caused by noctuid [%] |
| --- | --- | --- | --- |
| 55 | 3.8 | 33.2 | 2.68 |
| 50 | 3.6 | 0 | 2.76 |
| 0 | 75 | 0 | 4.78 |

As shown in the table 3, when the ultraviolet irradiance is changed to 55, 50, and 0 μW/cm$^2$, the ratio of damaged plants caused by the disease changes to 3.8, 3.6, and 75%, the ratio of leaf scorch decreases drastically to 33.2, 0, and 0%, and the ratio of damaged plants caused by the noctuid increases to 2.68, 2.76, and 4.78%. The ratio of damaged plants caused by the disease is lowest when the ultraviolet irradiance is 50 μW/cm$^2$, and the ratio of leaf scorch is lowest when the ultraviolet irradiance is 50 and 0 μW/cm$^2$. The ratio of damaged plants caused by the noctuid is lowest when the ultraviolet irradiance is 55 μW/cm$^2$, however, it is rarely different from that when the ultraviolet irradiance is 50 μW/cm$^2$. According to the above experimental result, when setting the ultraviolet irradiance to 50 μW/cm$^2$ or less, the ratio of damaged plants caused by the disease changes, the ratio of leaf scorch, and the ratio of damaged plants caused by the noctuid can be successfully decreased.

A table 4 described below shows a ratio of damaged fruits, a ratio of leaf scorch of plants, and an amount of phytoalexin-related material in plants in case of changing the integrated irradiance of UV-C and UV-B per day. Also in the present experiment, strawberry is used as a crop under test, and the ratio of damaged fruits is calculated by examining 50 strawberry fruits and the ratio of leaf scorch is calculated by examining 100 strawberry leaves. The irradiation of ultraviolet rays is repeated at least twice a day. The phytoalexin-related material is phenylalanine ammonia-lyase and is a resistive substance, in particular. In the present experiment, the phytoalexin-related material is obtained from the strawberry leaves and its amount is analyzed with High Performance Liquid Chromatography (HPLC). The UV-B ultraviolet lamp manufactured by Sankyo Denki Co., Ltd. (product number GL20E) is used as the UV light source.

TABLE 4

| Ultraviolet integrated irradiance [kJ/m$^2$] | Ratio of damaged fruits [%] | Ratio of leaf scorch [%] | Amount of phytoalexin-related material [μg/g] |
| --- | --- | --- | --- |
| 0.18 | 6.7 | 0 | 3.2 |
| 0.2 | 1.9 | 0 | 9.8 |
| 0.5 | 1.7 | 0 | 12.6 |
| 1 | 2.5 | 0 | 10.8 |
| 2 | 3.1 | 0 | 14.4 |
| 5 | 1.9 | 0 | 14.8 |
| 7 | 0.7 | 1.9 | 14.2 |
| 10 | 1.1 | 2.1 | 19.6 |
| 11 | 1.5 | 11.2 | 16.8 |
| 15 | 0.8 | 25.6 | 14.5 |

As shown in the table 4, when the ultraviolet irradiance is less than 0.2 kJ/m$^2$, the ratio of damaged fruits increases drastically, and when the ultraviolet irradiance is more than 10 kJ/m$^2$, the ratio of leaf scorch increases drastically.

As shown in the above experimental results, in the present preferred embodiment, UV-C can be emitted to the plant as well as UV-B, so that the spore formation and the hyphal growth of the filamentous fungi which cause gray mold, powdery mildew, downy mildew, anthracnose, or the like can be inhibited reliably (refer to the above table 1). Moreover, UV-C and UV-B are emitted intermittently, so that the plant is prevented from getting too used to ultraviolet rays, and as a result, the generation of the antibacterial substance including phytoalexin-related material can be promoted, and the disease resistance of the plant can reliably be induced (refer to the above table 2). Although the experimental result is omitted, the generation of the resistive substance including PR (Pathogenesis Related) protein material can also be promoted, and the disease resistance of the plant can reliably be induced. Moreover, the leaf scorch of the plant can be prevented by the above intermittent irradiation (refer to the above table 3). Furthermore, the visible light is continuously emitted, so that the plant growth can be promoted.

The total irradiance of UV-C and UV-B is set to approximately 50 μW/cm$^2$ or less as and the integrated irradiance of UV-C and UV-B is set to approximately 0.2 to 10 kJ/m$^2$ per day, so that the plant is not exposed to too much ultraviolet rays but can be irradiated with the appropriate amount of UV-C and UV-B (refer to the above table 4). Consequently, the scorch of the plant can reliably be inhibited and the occurrence of plant disease can be inhibited.

Moreover, ultraviolet rays which are emitted to the plant have almost no wavelength component in the range of UV-A, which promotes the spore formation of the filamentous fungi, so that the spore formation and the hyphal growth of the filamentous fungi can be inhibited more effectively and the spread of the plant disease can be reduced, and ultimately, crop yields can be increased. The light including UV-A has an effect to attract insects, so that the insect attraction is inhibited by blocking out UV-A, and a damage from a pest can thereby be reduced.

The present invention is not limited to the configuration of the above preferred embodiment, however, various modification are applicable in accordance with the intended use. For example, a combination of the light emitted from the visible light source 23 and natural sunlight or natural sunlight alone is also applicable as the visible light emitted to the plant.

Moreover, means for controlling the integrated irradiance of UV-C and UV-B to be approximately 50 μW/cm$^2$ or less is not limited to the controller 4, however, the integrated irradiance can also be controlled by using a coating film or evaporated film, which is formed on the lamp of the light source 2, or the filter 22 alone, or using them in combination, for example.

Figure 5:
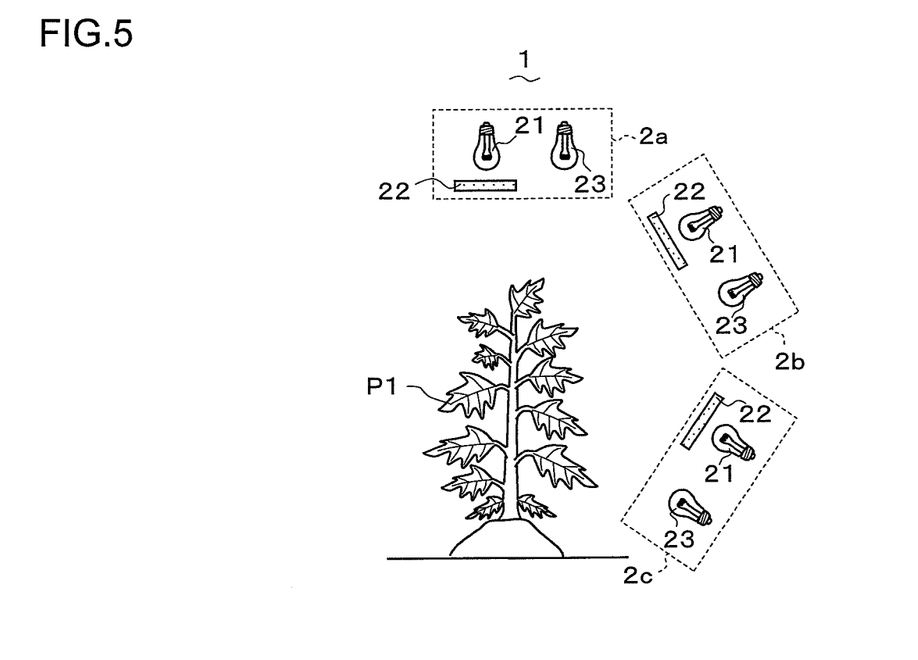
FIG. 5 is a front view showing another configuration example of the lighting apparatus in FIG. 1.

When the plural plants are planted and grown close relatively, the light source which irradiates the plants only from the upper side of the plants cannot sufficiently irradiate a lateral and bottom sides of the plants which are adjacent to each other by reason that the plants fall under shadow of the plants themselves, and thereby there is a possibility that the lateral and bottom sides of the plants are affected by a disease compared to the other part of the plants. Thus, in such a case, as shown in FIG. 5, it is preferable to set up the light source 2 on the lateral and bottom sides of the plant P1 as well as the upper side of the plant P1. Hereinafter, the light sources 2 which are located on the upper, lateral, and bottom sides of the plant P1 are referred to as an upper light source 2a, a lateral light source 2b, and a bottom light source 2c, respectively. They irradiate the upper side, the lateral side, and the bottom side of the plant P1. One lateral light source 2b and one bottom light source 2c are illustrated in FIG. 5, however, the number of the lateral light source 2b and bottom light source 2c is not limited to the above, and the plural light sources are also applicable, respectively.

Figure 6:
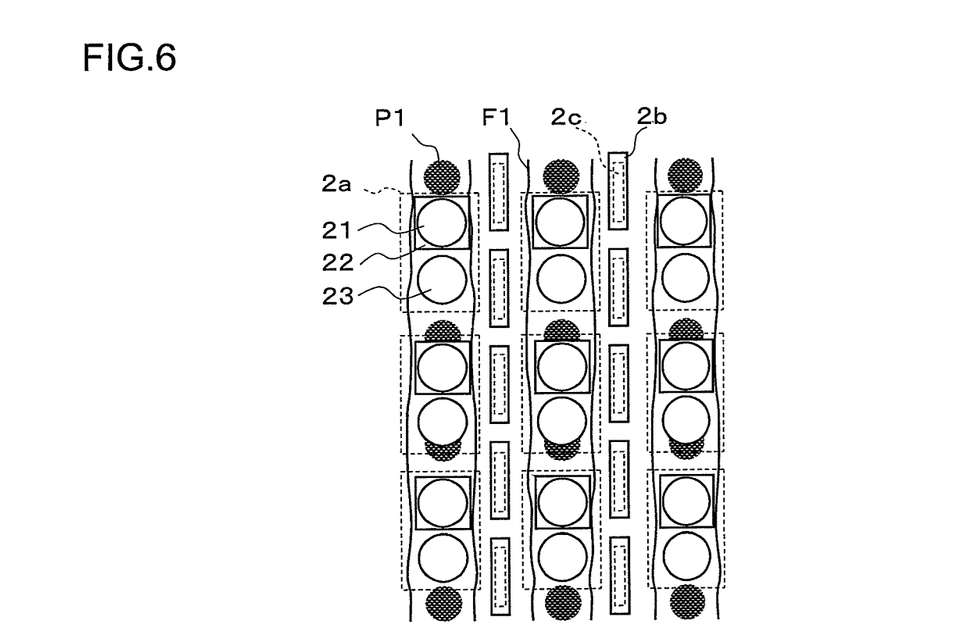
FIG. 6 is a front view showing still another configuration example of the light apparatus in FIG. 1.

When the plural plants P1 are planted along furrows F1, it is preferable to set up the plural upper light sources 2a, lateral light sources 2b, and bottom light sources 2c as shown in FIG. 6, respectively. The plural upper light sources 2a are set up at a predetermined interval along the furrows F1, and the plural lateral light sources 2b and bottom light source 2c are set up approximately in parallel with the furrows F1, in other words, approximately in parallel with the rows of plants P1. The lateral light source 2b and the bottom light source 2c are made up of a waterproof fluorescent lamp which is covered with a cylinder or the like, for example, and form lines approximately in parallel with the furrows F1. The lateral light source 2b and the bottom light source 2c can also be made up of a light source such as a lighting equipment having hollow light guide system or an electroluminescent (EL) equipment having optical fiber system or having elongate shape, for example. As described above, the upper light source 2a, the lateral light source 2b, and the bottom light source 2c are set up in rows, so that even when the plural plants P1 are planted over a wider range than the area irradiated by each light source, the lateral and bottom sides of the plants P1 can be irradiated with the light reliably.

It is also applicable to adjust a light distribution and light volume of the light source 2 in accordance with the growth of the plant P1. For example, when the plant P1 does not grow yet and is still small in an early stage of growth, the upper light source 2a is turned off and the lateral light source 2b and the bottom light source 2c are turned on, and additionally, a mounting angle of the lateral light source 2b and the bottom light source 2c is adjusted, for example. According to the above configuration, a spread of light is controlled and the light volume which irradiates the plant P1 is reduced. As the plant P1 grows up, the upper light source 2a is also turned on and the mounting angle of the lateral light source 2b and the bottom light source 2c is adjusted, for example, and thus the light distribution is enlarged and the light volume which irradiates the plant P1 is increased. The method for adjusting the light distribution and light volume of the lateral light source 2a and bottom light source 2c is not limited to the above example, however, when the light volume of the upper light source 2a is small or when the plant P1 needs relatively large amount of light, the upper light source 2a can be turned on even in the early stage of growth.

It is preferable that the lighting apparatus 1 is set up in an agricultural plastic greenhouse or a glass house (abbreviated as the house hereinafter), for example, which can block out the UV-A from solar ray to ensure the effect to control the plant disease more reliably. When the lighting apparatus 1 is used in the above house, the UV-A which is included not only in the light with which the plant P1 is irradiated by the lighting apparatus 1 but also in the natural sunlight provided from the sun to the plant P1 is cut off, so that the filamentous fungi can be controlled more effectively.

When the irradiance of UV-C and UV-B is high, there is a possibility of causing damage to a human body, for example, eyes and skin. Thus, it is preferable that a light shield plate and a human detection sensor switch are set up in the house and electrically connected to the lighting apparatus 1 so that the light distribution is controlled to prevent a worker from being irradiated with the light of the light source 2 or the light source 2 is turned on only when the worker is not in the house. The above control enables a safety ensuring of the worker in the house.

Figure 7:
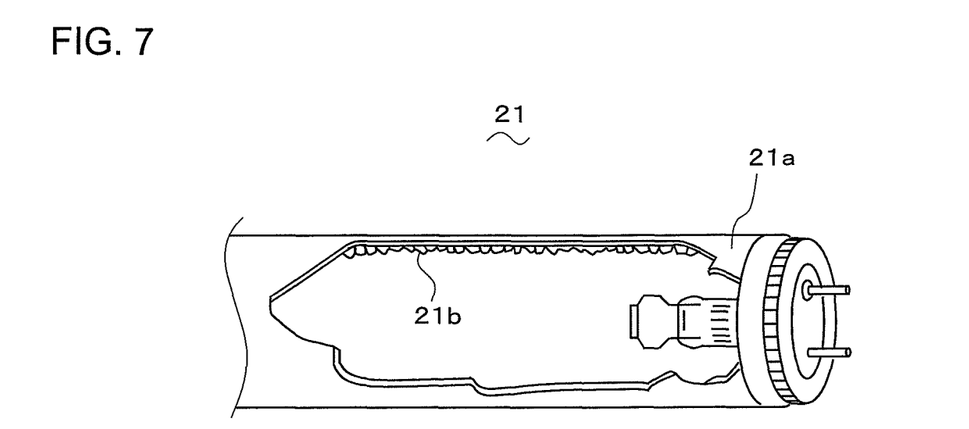
FIG. 7 is a perspective view showing a configuration example of a fluorescent lamp used as the UV light source in FIG. 2.

When the light source 21 is made up of the fluorescent lamp, as shown in FIG. 7, it is also applicable to apply a fluorescent material 21b, which has characteristics of emitting a light having almost no wavelength component of approximately 255 nm or less in the range of UV-C and almost no wavelength component in the UV-A range (the wavelength range of approximately 340 to 380 nm), to an inner side of a fluorescent tube 21a of the fluorescent lamp, instead of setting up the filter 22. In the above fluorescent lamp, at first, an electron is emitted by an electrical discharge, and a mercury atom receives energy of the electron and emits ultraviolet rays, and then the fluorescent material 21b absorbs the ultraviolet rays and ultimately emits the above light.

Although the present invention is fully described by the preferred embodiments with reference to the accompanying drawings, it is clear to the person having ordinary skill in the art that the various changes and modifications are applicable. Consequently, such changes and modifications do not depart from the scope of the present invention but are to be included in the scope of the present invention.

What is claimed is:

1. A lighting apparatus, which emits a light including ultraviolet rays to a plant for controlling a plant disease, the lighting apparatus comprising:

a UV light source which emits UV-B and UV-C in which a wavelength component of approximately 250 nm or less is cut off in UV-C;
a visible light source which emits visible light; and
a controller which controls an operation of the UV light source and the visible light source, wherein
the controller controls the respective light sources and repeats a light irradiation which has an irradiation pattern of combining a first light irradiation and a second light irradiation at least twice a day, wherein
the first light irradiation comprises the UV-C and UV-B and the visible light that are superimposed,
the second light irradiation comprises the visible light alone.

2. The lighting apparatus for controlling a plant disease according to claim 1, wherein the irradiation pattern is characterized in that the first light irradiation and the second light irradiation are sequentially repeated one after another by turning on the visible light source continuously and turning on the UV light source intermittently.

3. The lighting apparatus for controlling a plant disease according to claim 1, wherein the controller controls the respective light sources to emit the UV-C and the UV-B of approximately 50 $\mu W/cm^2$ or less as a total irradiance and emit the UV-C and the UV-B of approximately 0.2 to 10 $kJ/m^2$ as an integrated irradiance per day.

4. The lighting apparatus for controlling a plant disease according to claim 1, wherein the UV light source and the visible light source are set up on an upper side, a lateral side, and a bottom side of a plant which is an object to be irradiated.

5. The lighting apparatus for controlling a plant disease according to claim 1, wherein the UV light source includes a light source which emits UV-C and UV-B and a filter which blocks out a wavelength component of approximately 250 nm or less in the UV-C and UV-B emitted by the light source.

6. The lighting apparatus for controlling a plant disease according to claim 5, wherein the light source is made up of a fluorescent lamp which emits UV-C and UV-B, a HID (High Intensity Discharged) lamp, or a UV-LED alone or a combination of them.

7. The lighting apparatus for controlling a plant disease according to claim 5, wherein the filter has a UV-A-proof configuration.

8. The lighting apparatus for controlling a plant disease according to claim 2, wherein the controller controls the respective light sources to emit the UV-C and the UV-B of approximately 50 $\mu W/cm^2$ or less as a total irradiance and emit the UV-C and the UV-B of approximately 0.2 to 10 $kJ/m^2$ as an integrated irradiance per day.

9. The lighting apparatus for controlling a plant disease according to claim 2, wherein the UV light source and the visible light source are set up on an upper side, a lateral side, and a bottom side of a plant which is an object to be irradiated.

10. The lighting apparatus for controlling a plant disease according to claim 2, wherein the UV light source includes a light source which emits UV-C and UV-B and a filter which blocks out a wavelength component of approximately 250 nm or less in the UV-C and UV-B emitted by the light source.

11. The lighting apparatus for controlling a plant disease according to claim 10, wherein the light source is made up of a fluorescent lamp which emits UV-C and UV-B, a HID (High Intensity Discharged) lamp, or a UV-LED alone or a combination of them.

12. The lighting apparatus for controlling a plant disease according to claim 10, wherein the filter has a UV-A-proof configuration.

* * * * *